No. 786,949. PATENTED APR. 11, 1905.
T. BUMANN.
ANIMAL TRAP.
APPLICATION FILED JULY 1, 1904.
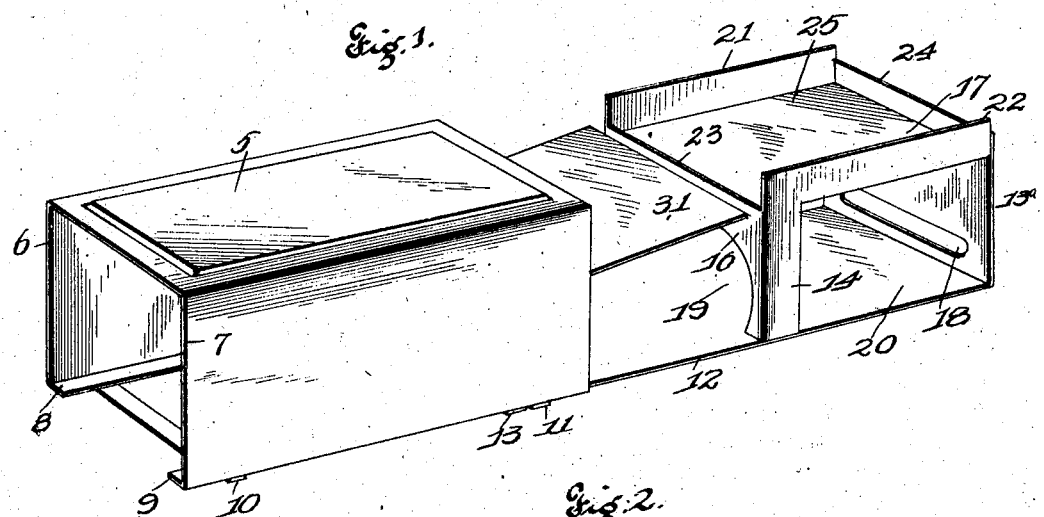
Witnesses
Alfred A. Eiiss
M. M. Brazill
Inventor
Theodore Bumann
by Higdon & Longan & Hopkins Attys No. 786,949. Patented April 11, 1905.

UNITED STATES PATENT OFFICE.

THEODORE BUMANN, OF LITCHFIELD, ILLINOIS.

ANIMAL-TRAP.

SPECIFICATION forming part of Letters Patent No. 786,949, dated April 11, 1905.

Application filed July 1, 1904. Serial No. 214,861.

*To all whom it may concern:*

Be it known that I, THEODORE BUMANN, a citizen of the United States, residing in Litchfield, Montgomery county, Illinois, have invented certain new and useful Improvements in Animal-Traps, of which the following is a specification containing a full, clear, and exact description, reference being had to the accompanying drawings, forming a part hereof.

My invention relates to animal-traps; and it consists of the novel features herein shown, described, and claimed.

In the drawings, Figure 1 is a perspective of an animal-trap embodying the principles of my invention, the trap being extended as required to remove the animal after it has been caught. Fig. 2 is a vertical central section of the trap set and ready for use. Fig. 3 is a vertical cross-section on the line 3 3 of Fig. 2 and looking in the direction indicated by the arrow. Fig. 4 is a perspective of the trap lying on its side to show the bottom, the parts being broken away to economize space.

Referring to the drawings in detail, the outer casing comprises the top 5, the sides 6 and 7, the bottom flanges 8 and 9, extending inwardly from the lower edges of the sides 6 and 7, and the braces 10 and 11, connecting with the flanges 8 and 9.

The bottom 12 is slidingly mounted upon the flanges 8 and 9, and a cross-piece 13 is attached to the bottom, the ends of the cross-piece being bent downwardly to engage under the flanges 8 and 9 between the braces 10 and 11, so that the bottom 12 cannot entirely be withdrawn from the casing.

The cage comprises in addition to the bottom 12 the rear end piece 13ª, extending upwardly from the bottom 12, the posts 14 and 15, extending upwardly from the sides of the bottom 12 near its center, the cross-piece 16, connecting the upper ends of the posts, and the top 17, resting upon the posts 14 and 15, the cross-piece 16, and the rear end piece 13ª. There is a ventilation-opening 18 in the rear end piece 13ª and an admission-opening 19 between the lower ends of the posts 14 and 15. When the bottom 12 is in position within the casing, the cage-chamber 20 is entirely closed, so as to prevent the escape of any animal, such as a mouse or rat, from the chamber.

Flanges 21 and 22 extend upwardly from the sides of the top 17 and narrower flanges 23 and 24 extend upwardly from the ends of the top 17, so as to form a bait-chamber 25 above the top. A wire is bent to form a pivotal portion 26 and the supporting-legs 27 and 28 at right angles to the pivotal portion, said supporting-legs being soldered to the bottom 12 at a point about one-fifth of the distance from the forward end of the bottom to the rear end. A ventilated wall 29 extends upwardly from the forward end of the bottom 12, and a floor 30 extends from the upper edge of the wall 29 to the posts 27 and 28 below the pivot 26.

The trap-door 31 is pivotally mounted upon the pivot 26, with its rear ends swinging closely to the cross-piece 16 and with its forward end resting upon the floor 30, said trap-door 31 being overbalanced forwardly, so that its forward end will rest upon the floor 30 and hold the rear end elevated.

A piece of suitable bait 32, which may be cheese or bread or other suitable material, is placed in the bait-chamber 25, and the floor 12 is slid forwardly into the outer casing, and then the trap is ready for use. A mouse or rat or other animal that is attracted by the bait 32 will climb up the wall 29 and climb upon the trap-door 31, and as he passes backwardly toward the bait the trap-door will tip down, as shown in the dotted lines in Fig. 2, and the animal will pass through the opening 19 into the cage. Then the trap-door will swing upwardly to its normal position and the animal cannot get out of the cage. When it is desired to remove the animal from the cage, the bottom 12 is slid backward, as shown in Fig. 1, thus releasing the animal.

I claim—

1. In an animal-trap, a suitable casing open at both ends; a floor slidingly mounted in the casing; a cage upon the rear end of the floor; a bait-chamber above the cage; and a trap-door pivotally mounted in front of the cage, substantially as described.

2. In an animal-trap, a suitable casing open at both ends; a floor slidingly mounted in the casing; a cage mounted upon the floor; a bait-chamber above the cage; and a trap-door pivotally mounted in front of the cage; said trap-door being overbalanced forwardly so that it will appear to lead to the bait; and said trap-door being overbalanced backwardly by the weight of the animal so as to lead to the cage.

In testimony whereof I have signed my name to this specification in presence of two subscribing witnesses.

THEODORE BUMANN.

Witnesses:
E. B. JORDON,
M. F. AHERN.